United States Patent
Ting

(10) Patent No.: US 10,394,287 B1
(45) Date of Patent: Aug. 27, 2019

(54) NOTEBOOK COMPUTER

(71) Applicants: Inventec (Pudong) Technology Corporation, Shanghai (CN); INVENTEC CORPORATION, Taipei (TW)

(72) Inventor: Ssu Han Ting, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/215,813

(22) Filed: Dec. 11, 2018

(30) Foreign Application Priority Data

Nov. 26, 2018 (CN) ............ 2018 1 1415473

(51) Int. Cl.
*G06F 1/16* (2006.01)
*H01Q 1/22* (2006.01)

(52) U.S. Cl.
CPC .......... *G06F 1/1681* (2013.01); *G06F 1/1616* (2013.01); *G06F 1/1637* (2013.01); *G06F 1/1662* (2013.01); *H01Q 1/2266* (2013.01)

(58) Field of Classification Search
CPC .............. G06F 1/1616; G06F 1/1681
USPC ...................... 361/679.27, 679.28
See application file for complete search history.

(56) References Cited

U.S. PATENT DOCUMENTS

2018/0287241 A1* 10/2018 Kumar ............... H01Q 1/2266
2019/0006736 A1* 1/2019 Hsu .................... H01Q 1/2266

* cited by examiner

*Primary Examiner* — Anthony Q Edwards
(74) *Attorney, Agent, or Firm* — Locke Lord LLP; Tim Tingkang Xia, Esq.

(57) ABSTRACT

This disclosure relates to a notebook computer including a computer host, display device, hinge and an antenna. The computer host includes a keyboard. The hinge includes a pivot part, a middle part and a connect part. The pivot part is connected to the computer host. The middle part is made of plastic and includes a first end and a second end opposite to each other. The first end is connected to the pivot part which is located between the keyboard and the second end in a width direction of the keyboard. The second end extends toward the display device and is connected to the connect part in an angle. The connect part is connected to the display device which is pivotably disposed at the computer host via the hinge. The antenna is located at the inner side of the middle part and is electrically connected to the computer host.

10 Claims, 4 Drawing Sheets

NOTEBOOK COMPUTER

CROSS-REFERENCE TO RELATED APPLICATIONS

This non-provisional application claims priority under 35 U.S.C. § 119(a) on Patent Application No(s). 2018-11415473.2 filed in China, P.R.C. on Nov. 26, 2018, the entire contents of which are hereby incorporated by reference.

TECHNICAL FIELD

The present disclosure relates to a notebook computer, more particularly to a notebook computer having an antenna disposed in a hinge.

BACKGROUND

Hardware performance and aesthetic appearance are important factors when buying notebook computer. Recently, the notebook computers having narrow border or borderless display become very popular in the market.

An antenna for wireless communication is commonly disposed around the screen to avoid signal interference between the antenna and the electrical components in the computer host.

SUMMARY

According to one aspect of the present disclosure, a notebook computer includes a computer host, display device, hinge and an antenna. The computer host includes a keyboard. The hinge includes a pivot part, a middle part and a connect part. The pivot part is connected to the computer host. The middle part is made of plastic and includes a first end and a second end opposite to each other. The first end is connected to the pivot part which is located between the keyboard and the second end in a width direction of the keyboard. The second end extends toward the display device and is connected to the connect part in an angle. The connect part is connected to the display device which is pivotably disposed at the computer host via the hinge. The antenna is located at the inner side of the middle part and is electrically connected to the computer host.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
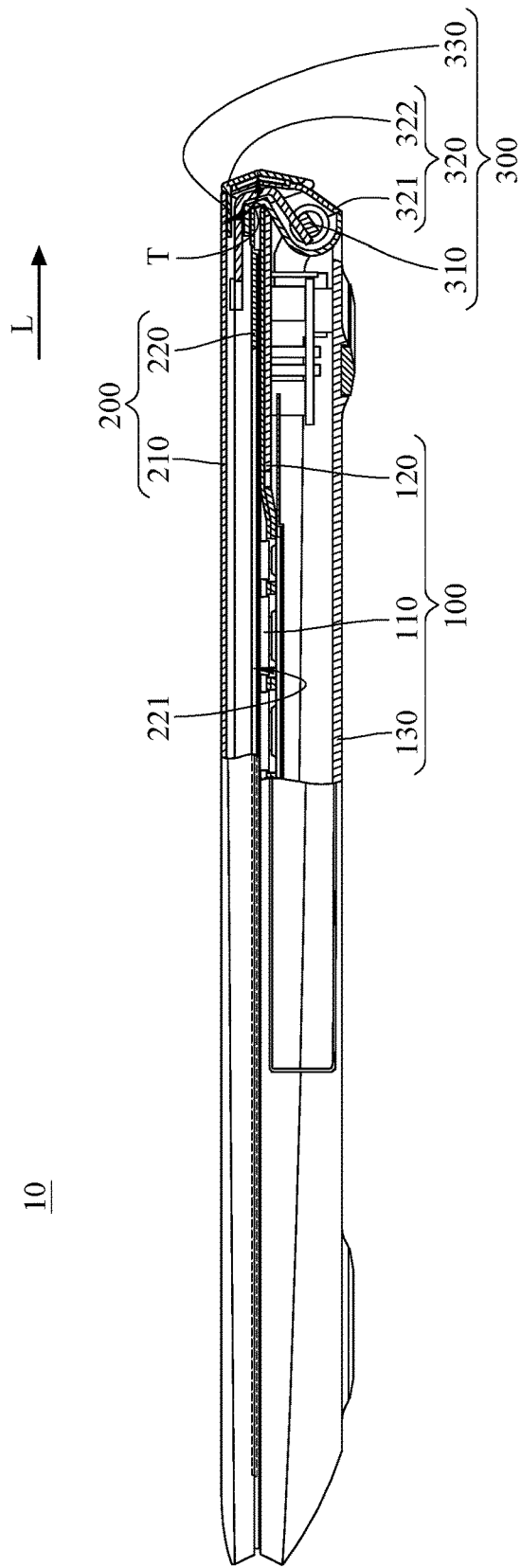
FIG. 1 is a partially cross-sectional view of a notebook computer according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a cross-sectional view of a notebook computer 10 according to one embodiment of the present disclosure.

This embodiment provides a notebook computer 10 including a computer host 100, a display device 200, a hinge 300 and an antenna 400. The computer host 100 includes a keyboard 110. The hinge 300 includes a pivot part 310, a middle part 320 and a connect part 330. In this and some embodiments of the present disclosure, the computer host 100 may further include a first host casing 120 and a second host casing 130 that are opposite to each other and connected to each other. Specifically, the first host casing 120 and the second host casing 130 can be assembled so as to enclose electrical components (not numbered) therebetween. The notebook computer 10 may be placed on a platform (e.g., a table) in a way that the second host casing 130 faces the platform. The keyboard 110 is located at the first host casing 120. The pivot part 310 is connected to the first host casing 120 of the computer host 100. In this embodiment, the middle part 320 is made of plastic and includes a first end 321 and a second end 322 opposite to each other. The first end 321 is connected to the pivot part 310. In a width direction L of the keyboard 110, which the width direction L is along a short side of the keyboard 110, the pivot part 310 is located between the keyboard 110 and the second end 322, and the second end 322 extends toward the display device 200 and is connected to the connect part 330 in an angle T. As such, the middle part 320 and the connect part 330 form a bent structure. The connect part 330 is connected to the display device 200. The display device 200 is pivotably disposed to the computer host 100 via the hinge 300 by taking the pivot part 310 as a pivot center.

Figure 2:
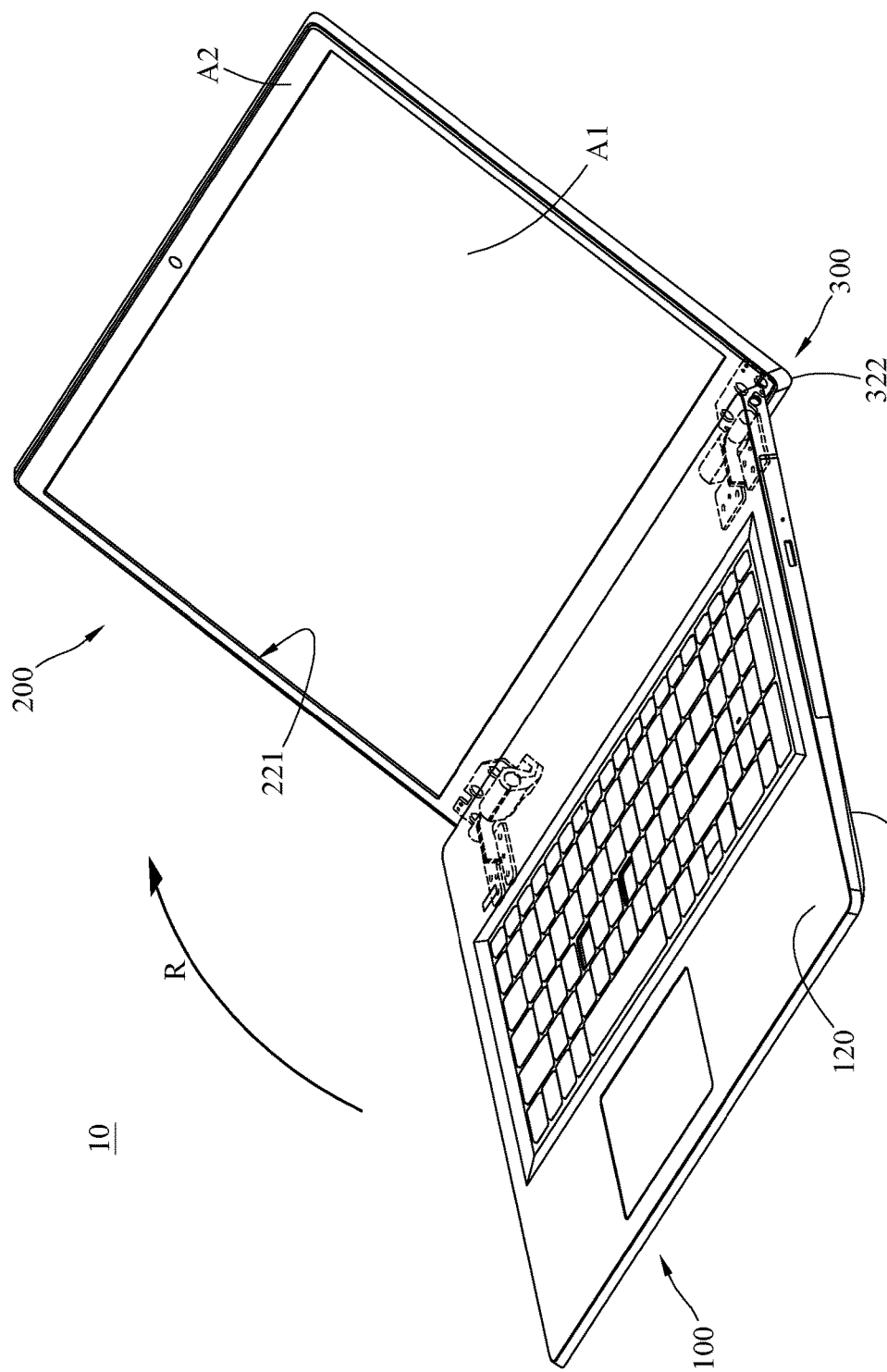
FIG. 2 is a perspective view of the notebook computer in FIG. 1 when a display device is opened.

Please refer to FIG. 2, which is a perspective view of the notebook computer 10 in FIG. 1 when the display device 200 is opened. In this and some embodiments of the present disclosure, while the display device 200 is pivoted in a pivot direction R with respect to the computer host 100, the second end 322 of the middle part 320 is moved away from the first host casing 120, and the bent structure of the hinge 300 pushes one side of the computer host 100 upward, i.e. away from the platform, and thus inclining the computer host 100 with respect to the platform. As a result, the keyboard 110 is angled upwards at a comfortable angle.

In this and some embodiments of the present disclosure, the display device 200 may further include a first display casing 210 and a second display casing 220 that are opposite to each other and connected to each other. The second display casing 220 may further have a display area 221. The display area 221 has a first area A1, and one side of the display device 200 has a second area A2, and the first area A1 is more than 85% of the second area A2. This causes the display device 200 to have a narrow border; that is, the display device 200 is able to provide a larger display area 221 in a limited size.

Figure 3:
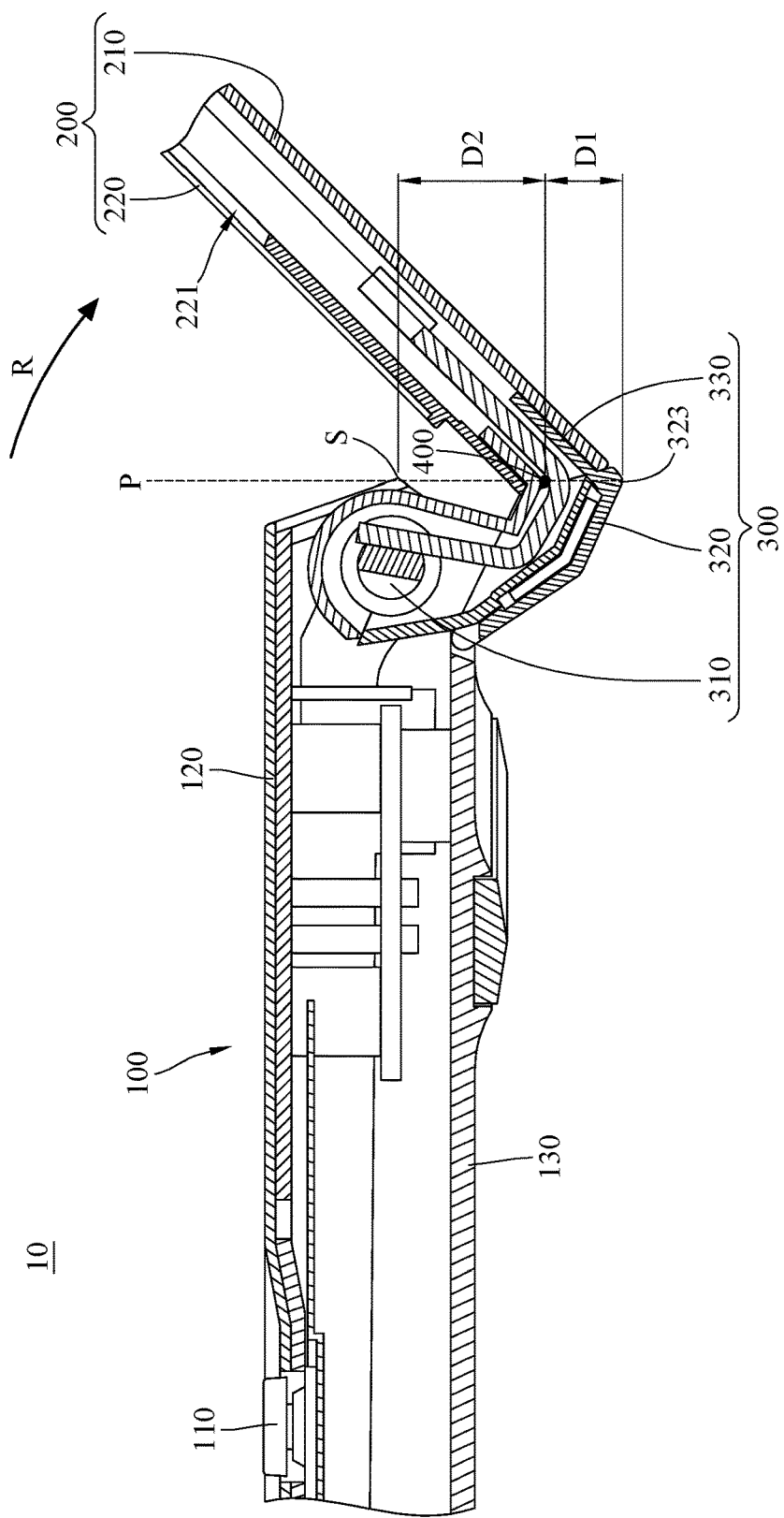
FIG. 3 is a partial and enlarged cross-sectional view of the notebook computer in FIG. 2.

Please refer to FIG. 3, which is a partial and enlarged cross-sectional view of the notebook computer 10 in FIG. 2. In this embodiment, the antenna 400 electrically connected to the computer host 100 is, for example, a 5G antenna, and the antenna 400 can be disposed at the inner side of the middle part 320 of the hinge 300. Therefore, the antenna 400 does not occupy too much space of the second area A2 of the display device 200. In addition, since the middle part 320 is made of plastic, the middle part 320 may not negatively affect the antenna 400; thus the signal transmission between the antenna 400 and the computer host 100 will not be affected.

In this and some embodiments of the present disclosure, the middle part 320 may further have a support side 323 located between the second end 322 and the connect part 330. The support side 323 of the hinge 300 is farther away from the first host casing 120 than the second host casing 130 when the display device 200 is opened. When the notebook computer 10 is placed on the platform or a user's laptop and the display device 200 is opened, the support side 323 can be used to contact the platform or the user's laptop. As shown in FIG. 3, a first distance D1 between the support side 323 and the antenna 400 ranges between 5 mm and 7 mm, which means that the distance between the antenna 400 and the user's lap is also approximately between 5 mm and 7 mm. Therefore, the notebook computer 10 complies with the restriction for Specific Absorption Ratio (SAR) in the human body. The SAR is a standard measurement of the rate at which radiation is absorbed by the human body. In some other embodiments, the first distance may not be restricted to the range between 5 mm and 7 mm if the antenna complies with the restrictions of SAR.

In this and some embodiments of the present disclosure, the first host casing 120 is made of metal, and the second host casing 130 is made of plastic. The second host casing 130 is close to the antenna 400 than the first host casing 120, and may not negatively affect the antenna 400. When a joint S between the first host casing 120 and the second host casing 130, the antenna 400 and the support side 323 are aligned in a vertical line P, a second distance D2 between the joint S and the antenna 400 ranges between 11 mm and 13 mm. The value of the second distance D2 is able to prevent the first host casing 120 from affecting the antenna 400. That is, in the case that the antenna 400 and the first host casing 120 are spaced apart by the second distance D2, the first host casing 120 is allowed to be made of metal. Therefore, the first host casing 120 can provide an aesthetical appearance of the notebook computer 10. In some other embodiments, if the antenna would not be negatively affected by the first host casing, the distance may not be restricted to the range between 11 mm and 13 mm.

In this and some embodiments of the present disclosure, the connect part 330 is hidden below the first display casing 210 and the hinge 300. The hinge 300 and the display device 200 each have a surface substantially flush with each other, thus the hinge 300 and the display device 200 look like in a single-piece, but the disclosure is not limited thereto. In some other embodiments, the connect part may be connected to the outside of the first display casing or the second display casing if the connect part and the display device have flush surfaces.

In this and some embodiments of the present disclosure, the first display casing 210 is made of metal and is electrically connected to the antenna 400 via, for example, a copper foil. Therefore, the antenna 400 can be grounded through the first display casing 210. Furthermore, the antenna 400 is spaced apart from the first display casing 210 and may not be negatively affected by the first display casing 210. In such a case, the first display casing 210 is allowed to be made of metal, thus the first display casing 210 can provide an aesthetical appearance of the notebook computer 10.

Figure 4:
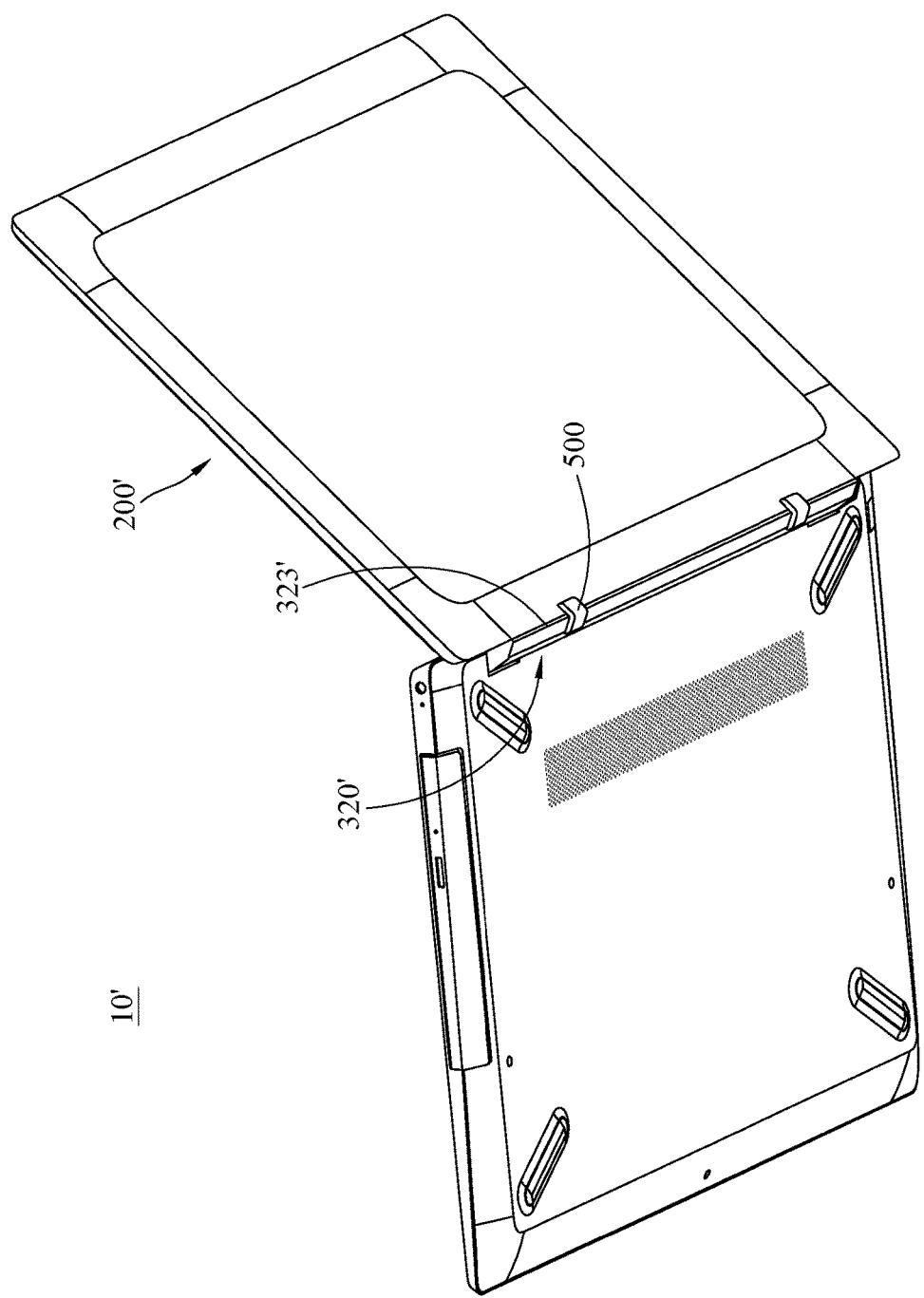
FIG. 4 is a perspective bottom view of a notebook computer according to another embodiment of the present disclosure when a display device is opened.

Please refer to FIG. 4, which is a perspective bottom view of a notebook computer 10' according to another embodiment of the present disclosure when a display device 200' is opened. It is noted that only the differences from the preceding embodiments are explained hereinafter. In this and some embodiments of the present disclosure, the notebook computer 10' may further include a protect component 500 (e.g., a rubber pad) disposed at the support side 323' of the middle part 320'. The notebook computer 10' may be placed on the platform in a way that the support side 323' faces to the platform, and the protect component 500 is located between the support side 323' and the platform. The protect component 500 is configured to prevent the middle part 320' from directly contacting with the platform so as to protect the hinge 300 from being scratched. However, the protect component 500 is optional. In some other embodiments, the notebook computer may not include the protect component.

According to the notebook computer discussed above, in a width direction of the keyboard, the pivot part is located between the keyboard and the second end, and the second end extends toward the display device and is connected to the connect part in an angle. As such, the middle part and the connect part form a bent structure. The antenna can be disposed at the inner side of the middle part of the hinge. Since the middle part is made of plastic, the middle part may not negatively affect the antenna; thus the signal transmission between the antenna and the computer host will not be affected.

In some other embodiments, while the display device is pivoted in a pivot direction with respect to the computer host, the second end of the middle part is moved away from the first host casing, and the bent structure of the hinge pushes one side of the computer host upward, and thus inclining the computer host with respect to the platform. As a result, the keyboard is angled upwards at a comfortable angle.

In some other embodiments, the first area is more than 85% of the second area. This causes the display device to have a narrow border; that is, the display device is able to provide a larger display area in a limited size.

In some other embodiments, when the notebook computer 10 is placed on a user's laptop and the display device is opened, the support side can be used to contact the platform or the user's laptop. As such, the distance between the antenna and the user's lap is approximately between 5 mm and 7 mm. Therefore, the notebook computer complies with the restriction for Specific Absorption Ratio (SAR) in the human body.

In some other embodiments, when a joint between the first host casing and the second host casing, the antenna and the support side are aligned in a vertical line, a second distance between the joint and the antenna ranges between 11 mm and 13 mm. The value of the second distance is able to prevent the first host casing from affecting the antenna. That is, in the case that the antenna and the first host casing are spaced apart by the second distance, the first host casing is allowed to be made of metal. Therefore, the first host casing can provide an aesthetical appearance of the notebook computer.

In some other embodiments, the connect part is hidden below the first display casing and the hinge. The hinge 300 and the display device 200 each have a surface substantially flush with each other, thus the hinge 300 and the display device 200 look like in a single-piece.

In some other embodiments, the first display casing is electrically connected to the antenna. Therefore, the antenna can be grounded through the first display casing. Furthermore, the antenna is spaced apart from the first display casing and may not be negatively affected by the first display casing. In such a case, the first display casing is allowed to be made of metal, thus the first display casing can provide an aesthetical appearance of the notebook computer.

In some other embodiments, the notebook computer may further include a protect component. The protect component is configured to prevent the middle part from directly contacting with the platform so as to protect the hinge from being scratched.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A notebook computer, comprising:
a computer host, comprising a keyboard;
a display device;
a hinge, comprising a pivot part, a middle part and a connect part, wherein the pivot part is connected to the computer host, the middle part is made of plastic and comprises a first end and a second end opposite to each other, the first end is connected to the pivot part located between the keyboard and the second end in a width direction of the keyboard, the second end extends toward the display device and is connected to the connect part in an angle, and the connect part is connected to the display device which is pivotably disposed at the computer host via the hinge; and
an antenna, located at the inner side of the middle part and electrically connected to the computer host.

2. The notebook computer according to claim 1, wherein the computer host further comprises a first host casing and a second host casing connected to each other, the keyboard is located at the first host casing, and the pivot part is connected to the first host casing.

3. The notebook computer according to claim 2, while the display device is pivoted with respect to the computer host, the second end of the middle part is moved away from the first host casing.

4. The notebook computer according to claim 2, wherein the middle part of the hinge further has a support side located between the second end and the connect part, and a first distance between the support side and the antenna ranges between 5 mm and 7 mm.

5. The notebook computer according to claim 4, wherein the first host casing is made of metal, and the second host casing is made of plastic; when a joint between the first host casing and the second host casing, the antenna and the support side are located in a vertical line by pivoting the display device with respect to the computer host, a second distance between the joint and the antenna ranges between 11 mm and 13 mm.

6. The notebook computer according to claim 4, further comprising a protect component disposed at the support side of the middle part.

7. The notebook computer according to claim 1, wherein the display device further comprises a first display casing and a second display casing connected to each other, and the connect part of the hinge is connected to the first display casing.

8. The notebook computer according to claim 7, wherein the first display casing is made of metal, and the antenna is electrically connected to the first display casing.

9. The notebook computer according to claim 7, wherein the second display casing further has a display area, and a first area of the display area is more than 85% of a second area of the second display casing.

10. The notebook computer according to claim 1, wherein the antenna is a 5G antenna.

* * * * *